May 19, 1964    P. T. SCHURMAN ETAL    3,133,663
PLASTIC CONTAINER AND CLOSURE
Filed Oct. 15, 1962
FIG. 1.
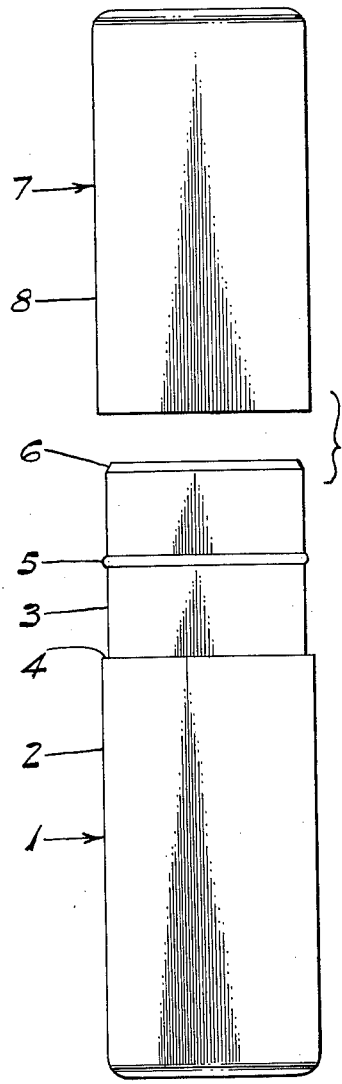
FIG. 2.
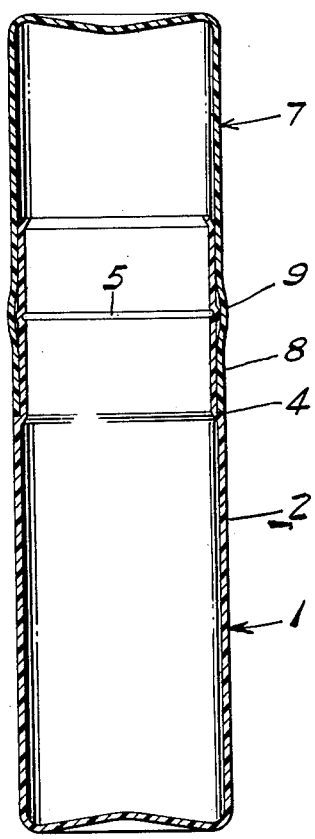
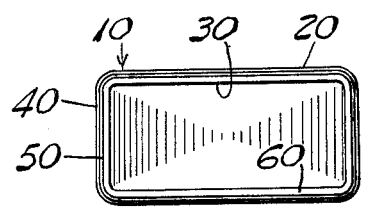
FIG. 3.
INVENTORS
PETER T. SCHURMAN &
RAYMOND C. CONFER
BY
Christel & Bean
ATTORNEYS.

United States Patent Office 3,133,663
Patented May 19, 1964

3,133,663
PLASTIC CONTAINER AND CLOSURE
Peter T. Schurman, Snyder, and Raymond C. Confer, Gasport, N.Y., assignors to Airmold Plastics Inc., Tonawanda, N.Y.
Filed Oct. 15, 1962, Ser. No. 230,562
5 Claims. (Cl. 220—42)

This invention relates generally to the container art, and more specifically to a new and useful container and closure of thermoplastic material.

A primary object of our invention is to provide a thermoplastic container and closure construction producing a tight seal therebetween and providing a smooth, substantially continuous side wall form when assembled.

Another object of our invention is to provide a thermoplastic container and closure as aforesaid having a positive stop defining the fully on position of the closure.

In one aspect thereof, a container and closure of our invention is characterized by the provision of a container of thermoplastic material having a main body portion and a reduced end portion having an enlarged bead formation therearound in spaced relation to the ledge, and a closure of thermoplastic material having a distensible side wall portion of substantially the same cross-sectional dimensions as the container main body portion at the ledge, the closure side wall portion slip-fitting over the reduced end portion of the container and being distended by the bead formation to provide a tight seal, the closure side wall portion then contracting about the reduced end portion and seating against the ledge to provide a closed container of smooth, substantially continuous side wall form.

The foregoing and other objects, advantages and characterizing features of a container and closure of our invention will become clearly apparent from the ensuing detailed description of two presently contemplated embodiments thereof, taken in conjunction with the accompanying drawing illustrating the same wherein like reference numerals denote like parts throughout and wherein:

FIG. 1 is a side elevational view of a thermoplastic container and closure of our invention, the closure being separated from the container;

FIG. 2 is a longitudinal sectional view thereof, but with the closure in fully seated position on the container; and FIG. 3 is an end elevational view of a flat-sided container of our invention.

The container of our invention is made of any suitable thermoplastic material, polyethylene, polyvinyl, polypropylene, polystyrene and elastomeric polyolefin being examples of plastic materials suitable for the intended purpose. The container closure also is made of a thermoplastic material, but one possessing sufficient elasticity to provide the desired seal with the container as more fully described hereafter. Polyethylene, polyvinyl and elastomeric polyolefin are examples of materials suitable for the closure.

Referring now in detail to the illustrative embodiment of our invention shown in FIGS. 1 and 2, the same comprises a container member 1 having a main body portion 2 closed at its lower end, and a reduced diameter end portion 3 extending from the other, upper end of main body portion 2. The reduced end portion 3 forms an outwardly or upwardly facing peripheral shoulder or ledge 4 around container 1 at the juncture of end portion 3 with main body portion 2, and in the illustrated form the width of ledge 4 is equal or substantially equal to the wall thickness of main body portion 2.

The reduced end portion 3 is provided with an enlarged, outwardly projecting, annular bead formation 5 extending therearound, in spaced relation to ledge 4, for distending the cover member as will be described. If desired, the outer end 6 of reduced end portion 3 can be tapered, as shown, to facilitate slip-fitting the container cover thereon.

A cover is provided in the form of a cap or closure 7 having an annular skirt 8 of substantially the same cross-sectional dimensions as main body portion 2 of container 1. That is, the inner and outer diameters of closure skirt 8 are identical, or nearly identical to the corresponding dimensions of container main body 2, in the illustrated embodiment. As a result, the wall thickness of skirt 8 is the same or nearly the same as the width of ledge 4, whereby the closure skirt comprises a substantially uninterrupted continuation of container main body 2. The outer diameter of reduced end portion 3 being the same or nearly the same as the inner diameter of main body portion 2, the closure skirt 8 closely slip-fits about the container reduced end 3, as shown in FIG. 2. As a result, the closure skirt 8 is distended, in passing over the bead formation 5, as shown at 9 in FIG. 2.

This distension of the closure skirt 8 by the bead 5, completely around the inner periphery of the closure skirt, insures a seal sufficiently tight as to render the container watertight so long as the closed container is not unduly distorted. In addition, it secures the closure 7 in position on container 1. While the closure can readily be removed, by deliberately slipping it off the container end 3, it is secured in closed position against inadvertent or accidental displacement.

Bead 5 is spaced from ledge 4 a distance sufficient to enable the skirt 8 to lay back, and contract about the reduced end portion 3 in the region between bead 5 and ledge 4. This distance is on the order of three-eighths of an inch, or more. As a result, the memory characteristic of the thermoplastic closure skirt material causes the open end of the closure to contract about the container reduced end portion, after passing over and being distended by the bead 5, whereby the closure end is alined with ledge 4 and seats thereagainst. The ledge 4 thereby provides a positive stop, defining the fully closed position of the closure member 7.

The identity, or substantial identity in outer diameter of the container main body 2 and the closure skirt 8 at the juncture therebetween causes the latter to comprise a continuation of the former. This provides the fully closed container with a substantially continuous outer wall, giving a smooth, pleasing appearance. The distension 9, although sufficient to provide a tight seal, blends smoothly with the adjacent side wall and is so slight as to be barely perceptible.

Thus, it is seen that the container and closure of our invention fully accomplish the intended objects, providing a tightly sealed thermoplastic container, with the closure secure against displacement while being readily removable when desired, and providing a positive stop while preserving a smooth and streamlined appearance. The container is adapted for blow molding, and the closure can be either injection or blow molded.

The container and closure of our invention have utility for a wide variety of purposes. The form of FIGS. 1 and 2 is useful, for example, in the storing of blue prints and other rolled papers. For some purposes, a flat-sided container is more suitable, as for example in packaging items such as hacksaw blades and the like, and the container and closure of our invention are readily provided in flat-sided form, as illustrated in FIG. 3.

The container 10 has a main body 20 and a reduced end 30 adapted to receive a closure, not shown, corresponding to the container 10 in the same manner as closure 7 corresponds to its container 1. The juncture between reduced end 30 and main body 20 provides a ledge 40 completely around container 10, and the reduced end portion 30 is provided with an enlarged bead formation 50 completely therearound, in spaced relation from ledge 40 just as bead 5 is spaced from ledge 4. The outer end of reduced end portion 30 can be tapered, as at 60. Except for side wall form, the embodiment of FIG. 3 is in all respects the same as the embodiment of FIGS. 1 and 2, and it has been added to this disclosure only to show that the container and closure of our invention are not limited to a particular cross-sectional configuration.

Having fully disclosed and completely described our invention, and its mode of operation, what we claim as new is:

1. A container and closure therefor comprising, a container of thermoplastic material having a main body portion and a reduced end portion forming an external shoulder around said container at the juncture of said main body and reduced end portions thereof, said reduced end portion having an enlarged bead formation therearound in spaced relation to said shoulder, and a closure of thermoplastic material having a distensible side wall portion slip-fitting over said container end portion, said closure side wall portion having substantially the same cross-sectional dimensions as said shoulder and being distended by said bead formation to provide a seal, said bead formation being spaced from said shoulder a distance sufficient to enable said closure side wall portion to contract about said container end portion between said bead formation and said shoulder and seat against the latter when said closure is in fully closed position on said container.

2. A container and closure therefor comprising, a container of thermoplastic material having a main body portion closed at one end thereof and a reduced end portion at the opposite end thereof, said main body portion providing a ledge around said container at the juncture between said container portions, said reduced end portion having an outer dimension substantially equal to the inner dimension of said main body portion and having an outwardly projecting bead formation therearound in spaced relation to said ledge, and a closure of thermoplastic material having a distensible side wall portion slip-fitting over said container end portion, said closure side wall portion being of substantially the same cross-sectional dimensions as said container main body portion at said ledge and being distended by said bead formation to provide a seal, said bead formation being spaced from said ledge a distance sufficient to enable said closure side wall portion to contract about said container end portion between said ledge and said bead formation, said closure side wall portion seating against said ledge and forming a continuation of said container main body portion when said closure is in fully closed position on said container.

3. A container and closure therefor as set forth in claim 2, wherein the outer end of said container reduced end portion is tapered.

4. A container and closure therefor as set forth in claim 2, wherein said container and said closure are of curved side wall form.

5. A container and closure therefor as set forth in claim 2, wherein said container and said closure are of flat side wall form.

References Cited in the file of this patent

UNITED STATES PATENTS

| | | |
|---|---|---|
| 2,718,980 | Strom | Sept. 27, 1955 |
| 2,852,054 | Motley | Sept. 16, 1958 |
| 2,998,896 | Miller | Sept. 5, 1961 |
| 3,032,939 | Andersen | May 8, 1962 |